United States Patent [19]

Jönsson et al.

[11] 3,711,592

[45] Jan. 16, 1973

[54] METHOD FOR SEPARATION OF TUNGSTEN CHLORIDE FROM A MIXTURE OF METAL CHLORIDES

[76] Inventors: Kurt Alfred Jönsson, Sandhamnsvagen 27; Elis Kjell Åke Svänstrom, Bjorkstigen 8, both of Synashamn, Sweden

[22] Filed: May 17, 1971

[21] Appl. No.: 144,295

Related U.S. Application Data

[63] Continuation-in-part of Ser. No. 856,211, Sept. 8, 1969.

[30] Foreign Application Priority Data

Sept. 12, 1968 Sweden..............................12273/68

[52] U.S. Cl....................................423/60, 423/492
[51] Int. Cl..............................................C01g 41/00
[58] Field of Search......23/17, 21, 87 R; 423/60, 492

[56] References Cited

OTHER PUBLICATIONS

Steele et al.; "Extraction and Refining of the Rarer Metals," The Institution of Mining and Metallurgy, London, 1957, pp. 287–294.

Ullman, "Encyklopadic der technischen Chemie," Munchen, 1965, 3rd Ed., p. 658.

*Primary Examiner*—Herbert T. Carter
*Attorney*—Brumbaugh, Graves, Donohue & Raymond

[57] ABSTRACT

Tungsten hexachloride is separated from a mixture of metal chlorides comprising tungsten pentachloride and other metal chlorides by first distilling the mixture so as to remove lower boiling chlorides than tungsten pentachloride. The mixture is then chlorinated, preferably at a temperature around that of the boiling point of the tungsten pentachloride. Generally the chlorination will be continued as the temperature of the mixture is increased to about the boiling point of tungsten hexachloride. The chlorination is continued until essentially all of the pentachloride has been converted to hexachloride. The hexachloride may be distilled from higher boiling chlorides if they are present in the mixture to thereby obtain a high purity product which can be converted to tungsten metal by reduction.

12 Claims, No Drawings

METHOD FOR SEPARATION OF TUNGSTEN CHLORIDE FROM A MIXTURE OF METAL CHLORIDES

This application is a continuation-in-part of applicants' copending U.S. Patent application Ser. No. 856,211, filed Sept. 8, 1969.

The present invention relates to a method for the production of tungsten hexachloride from a mixture of metal chlorides which comprises tungsten pentachloride as well as other chlorides.

The demand for tungsten metal is great, and the price of this metal is quite high due to the fact that the methods used to separate it from the raw ore are very uneconomic. As a consequence various experimenters have utilized different ways of producing tungsten metal at a cheaper price by recovering this metal from non-ore materials. One such way is by chlorinating a metallic product containing tungsten, separating the yielded tungsten-containing chlorides by distillation, and the reduction of the distilled tungsten chlorides to tungsten metal. This method has been used on various starting materials, such as hard metal scraps, tungsten alloys and ferro-tungsten alloys. The chlorination is normally carried out on a static bed at an elevated temperature, and the reaction between the metal and the chlorine is rapid due to the metal's great affinity for chlorine. When several chlorides of a metal are present in the substance those which are less rich in chlorine are obtained in either greater or smaller amounts depending upon the conditions utilized in the reaction. It has been found that tungsten pentachloride and tungsten hexachloride, which have boiling points of 275° and 347° C., respectively, are generally obtained by chlorinating tungsten-containing metals. In order to produce tungsten chloride by fractional distillation, it is most desirable that the tungsten salt be tungsten hexachloride. This is due to the fact that most of the alloyed materials and impurities in tungsten-containing metals form chlorides with a boiling point considerably below that of tungsten hexachloride. Thus a fractional distillation of the hexachloride insures a cleaner separation. On the other hand, a number of metal chlorides have boiling points close to that of tungsten pentachloride and present a problem to good removal if this salt were intended to be removed by fractional distillation. Examples of some chlorides which boil at a temperature very close to the boiling point of the pentachloride of tungsten are molybdenum pentachloride, niobium pentachloride, and tantalum pentachloride. These have boiling points of 268°, 254°, and 239° C., respectively.

The present invention is directed to a procedure whereby it is possible to obtain high purity tungsten hexachloride from a mixture containing tungsten pentachloride, tungsten hexachloride, and other metallic chlorides which are commonly produced when a tungsten-containing material is chlorinated. When such a mixture of metal chlorides is present it is possible to chlorinate the mixture in a distillation column and convert the tungsten pentachloride to tungsten hexachloride. By converting the pentachloride to the hexachloride salt the problem of the interference during distillation of metal chlorides having a boiling point close to that of the pentachloride is eliminated. It is then possible once the hexachloride salt is formed from the pentachloride to obtain a very pure sample of tungsten hexachloride.

The chlorination reaction takes place quite easily at temperatures which are approximately that of the boiling point of tungsten pentachloride (i.e., about 275° C.). Both the vapor pressure for tungsten pentachloride and the activity of chlorine gas against the pentachloride fall rapidly for every degree decrease below 275° C. Therefore the chlorination takes place most effectively at about the boiling point of the pentachloride. It is desirable that the chlorination be begun at about 265°–275° C. When a mixture of metal chlorides is present which contains tungsten pentachloride as well as metal chlorides having other boiling points, it is most advantageous to distill from the mixture the main part of those components which have lower boiling points than that of the tungsten pentachloride. This is most advantageously performed before the chlorination reaction is begun. However, if desired, the chlorination reaction could be performed before the temperature of the molten mixture of metal chlorides is raised to the vicinity of the boiling point of tungsten pentachloride although this is not the most effective way to chlorinate the mixture.

In a preferred embodiment the chlorination is begun after the chlorides having a lower boiling point than that of tungsten pentachloride have been removed so that the mixture will contain a variety of metal chlorides including tungsten pentachloride and molten metal chlorides having a boiling point above that of the pentachloride, such as rhenium chloride (boiling point = 327° C.). Generally, tungsten hexachloride is also present in the mixture. Since the chlorides contained in the mixture are usually soluble in each other, it is often not possible to fix a definite boiling point for the tungsten pentachloride contained in that particular mixture. This means that when the temperature is increased the evaporation of tungsten pentachloride will begin slightly below the normal boiling point for that salt and will end at a point which is substantially above the normal boiling point. Generally, it is necessary to increase the temperature of the entire molten mixture up to approximately that of the boiling point of tungsten hexachloride and at the same time perform the chlorination of the mixture to insure that the pentachloride in the mixture will be reacted with the chlorine to convert it into tungsten hexachloride.

During the chlorination the top of the still is strongly cooled so that a total return flow is performed. This condition is maintained as long as any tungsten pentachloride is present, namely, as long as any chlorine is reacting with remaining tungsten pentachloride. When all the pentachloride has been transformed to hexachloride, the chlorine gas leaves the top condensor and can be detected when leaving the still. If at that time no other chlorides than the hexachloride are present, it can be cooled down and the pure hexachloride can be removed. If higher boiling chlorides remain the hexachloride may be distilled from them.

The above-mentioned procedure is most advantageously performed in a distillation apparatus. This enables the chlorination and conversion of the pentachloride to the hexachloride to be performed in conjunction with the distillation of the lower boiling chlorides from the mixture as well as the distillation of the hexachloride if it is rendered necessary by the presence of higher boiling chlorides. The chlorination is performed by introducing chlorine gas "to" the mixture. The term "to" is meant to embrace both addition of the gas above the mixture as well as addition directly into the melt.

The present invention is illustrated by the following examples:

EXAMPLE 1

A mixture of tantalum, niobium and tungsten chlorides was mixed together. MEtal chlorides having a higher boiling point than tungsten hexachloride were not present so that only pure tungsten hexachloride would remain in the still after the distillation of chlorides having a lower boiling point than tungsten pentachloride and after the chlorination of the mixture to convert the pentachloride to hexachloride. Although the main part of the tungsten chloride portion was tungsten hexachloride, a part of the tungsten content was tungsten oxytetrachloride and tungsten pentachloride.

The tungsten oxytetrachloride, tantalum pentachloride and niobium pentachloride were distilled off to a special condensor. The distillate discharge was then interrupted by cooling the top condensor. The column was operated with a total return flow of 130 kg chlorides/hour.

Gaseous chlorine was then added at a flow rate of 4 kg/hour. No chlorine gas left the column so all of it was reacting with the components remaining in the still. At the same time an increase of the temperature in the column was observed.

When the temperature at the bottom of the condensor approached 347° C. the chlorine addition was interrupted. The condensor was cooled, and pure tungsten hexachloride was removed.

EXAMPLE 2

A mixture of metal chlorides was mixed in the same manner as set forth in Example 1, with the exception that some metal chlorides having higher boiling points than that of tungsten hexachloride were present in the mixture.

After processing as in Example 1, and when a flow of chlorine gas was observed in the outgoing line from the still, the chlorine addition was interrupted. At that time those chlorides having higher boiling points than that of tungsten hexachloride remained in the still with the hexachloride. The distillation was continued, and pure tungsten hexachloride was distilled from the higher chlorides.

Many modifications of the above-described method will become apparent to those skilled in the art upon reading the description thereof. Therefore, the preceding description is intended to be merely illustrative of the method and not limiting thereof. The invention is defined in the following claims.

We claim:

1. A method for the production of tungsten hexachloride from a mixture of molten metal chlorides comprising tungsten pentachloride in a distillation apparatus which comprises heating the mixture in the distillation apparatus, adding chlorine to the mixture in such apparatus, said addition being begun at about the boiling point of tungsten pentachloride, and continuing said addition of chlorine while the temperature is raised above that boiling point until substantially all the tungsten pentachloride in the mixture is transformed into tungsten hexachloride and recovering tungsten hexachloride from the mixture remaining in the apparatus.

2. A method as claimed in claim 1 in which the mixture of molten metal chlorides also comprises metal chlorides having a lower boiling point than that of tungsten pentachloride and these lower boiling chlorides are distilled from the mixture prior to adding the chlorine.

3. A method as claimed in claim 1 in which the chlorine is added into the mixture of molten chlorides.

4. A method as claimed in claim 1 in which the chlorine is added above the mixture of molten metal chlorides.

5. A method as claimed in claim 1 in which the mixture further comprises chlorides having a higher boiling point than that of tungsten hexachloride and the tungsten hexachloride is distilled from these higher boiling chlorides.

6. A method as claimed in claim 1 in which the chlorine addition is continued until the temperature is increased to about the boiling point of tungsten hexachloride.

7. A method for the production of tungsten hexachloride from a mixture of molten metal chlorides comprising tungsten pentachloride in a distillation apparatus which comprises heating the mixture in the distillation apparatus, adding chlorine to the mixture at about a temperature of 265°C. and continuing the addition of chlorine until all the tungsten pentachloride has been transformed into tungsten hexachloride and recovering tungsten hexachloride from the mixture remaining in the apparatus.

8. A method for the production of tungsten hexachloride from a mixture of molten metal chlorides comprising tungsten pentachloride, chlorides having a lower boiling point than that of tungsten pentachloride, and chlorides with a higher boiling point than that of tungsten pentachloride, in a distillation apparatus which comprises heating the mixture in the distillation apparatus, distilling off metal chlorides having lower boiling points than that of tungsten pentachloride in the presence of chlorine introduced into said apparatus until all tungsten pentachloride has been transformed into tungsten hexachloride and distilling the tungsten hexachloride from existing chlorides having higher boiling points than that of tungsten hexachloride.

9. The method of claim 8 wherein chlorine is added into the mixture of molten chlorides.

10. A method for the production of tungsten hexachloride from a mixture of molten metal chlorides comprising tungsten pentachloride, and chlorides having a lower boiling point than that of tungsten pentachloride, in a distillation apparatus which comprises heating the mixture in the distillation apparatus, distilling off metal chlorides having lower boiling points than that of tungsten pentachloride in the presence of chlorine introduced into said apparatus until all tungsten pentachloride has been transformed into tungsten hexachloride and recovering tungsten hexachloride from the mixture remaining in the apparatus.

11. The method of claim 10 wherein chlorine is added into the mixture of molten chlorides.

12. A method for the production of tungsten hexachloride from a mixture of molten metal chlorides comprising tungsten pentachloride in a distillation apparatus which comprises:

a. heating the mixture in the distillation apparatus while adding chlorine to the mixture, said addition of chlorine being begun at a temperature of about 265° to 275° C.;

b. continuing the addition of chlorine while the temperature is raised above about 275° C. until substantially all the tungsten pentachloride in the mixture is transformed into tungsten hexachloride; and c. separating the metal chlorides from the tungsten hexachloride by distillation.

* * * * *